United States Patent [19]

Otani et al.

[11] Patent Number: 4,767,907
[45] Date of Patent: Aug. 30, 1988

[54] METHOD OF IGNITING ARCS BY PROJECTION OF IGNITION-PLASMA TO THE CATHODE

[75] Inventors: Tadayuki Otani; Taizo Nakamura; Tohru Saito, all of Sagamihara, Japan

[73] Assignee: Nippon Steel Corporation, Tokyo, Japan

[21] Appl. No.: 855,650

[22] Filed: Apr. 25, 1986

[30] Foreign Application Priority Data

| Apr. 27, 1985 | [JP] | Japan | 60-91985 |
| Sep. 9, 1985 | [JP] | Japan | 60-199225 |
| Sep. 20, 1985 | [JP] | Japan | 60-207976 |
| Nov. 6, 1985 | [JP] | Japan | 60-248441 |
| Nov. 6, 1985 | [JP] | Japan | 60-248443 |
| Nov. 27, 1985 | [JP] | Japan | 60-266924 |
| Dec. 6, 1985 | [JP] | Japan | 60-274575 |

[51] Int. Cl.$^4$ ............................................. B23K 9/00
[52] U.S. Cl. ........................... 219/121.56; 219/121.52; 219/121.59; 219/121.54
[58] Field of Search ................. 219/121 PT, 121 PV, 219/121 PW, 121 PY, 137 PS, 74, 75; 313/231.31–231.51; 315/111.21, 111.31

[56] References Cited

U.S. PATENT DOCUMENTS

| 3,309,564 | 3/1967 | Poulsen | 315/111.21 |
| 3,344,256 | 9/1967 | Anderson | 219/121 PW |
| 3,450,926 | 6/1969 | Kiernan | 219/121 PW |
| 4,324,971 | 4/1982 | Frappier | 219/121 PW |
| 4,390,773 | 6/1983 | Esser et al. | 219/121 PA |

FOREIGN PATENT DOCUMENTS 0101341 10/1972 Japan .
2092933 8/1982 United Kingdom .

OTHER PUBLICATIONS

Radio Frequency-Free Arc Starting in Gas Tungsten Arc Welding, Correy et al.-*Welding Journal*, pp. 33–41, May 1985.

*Primary Examiner*—M. H. Paschall
*Attorney, Agent, or Firm*—Pollock, Vande Sande & Priddy

[57] ABSTRACT

A method of igniting arcs wherein an electric field is formed in the vicinity of an electrode and ignition-plasma is projected against a cathode in the electric field, to thereby ignite an arc.

4 Claims, 14 Drawing Sheets

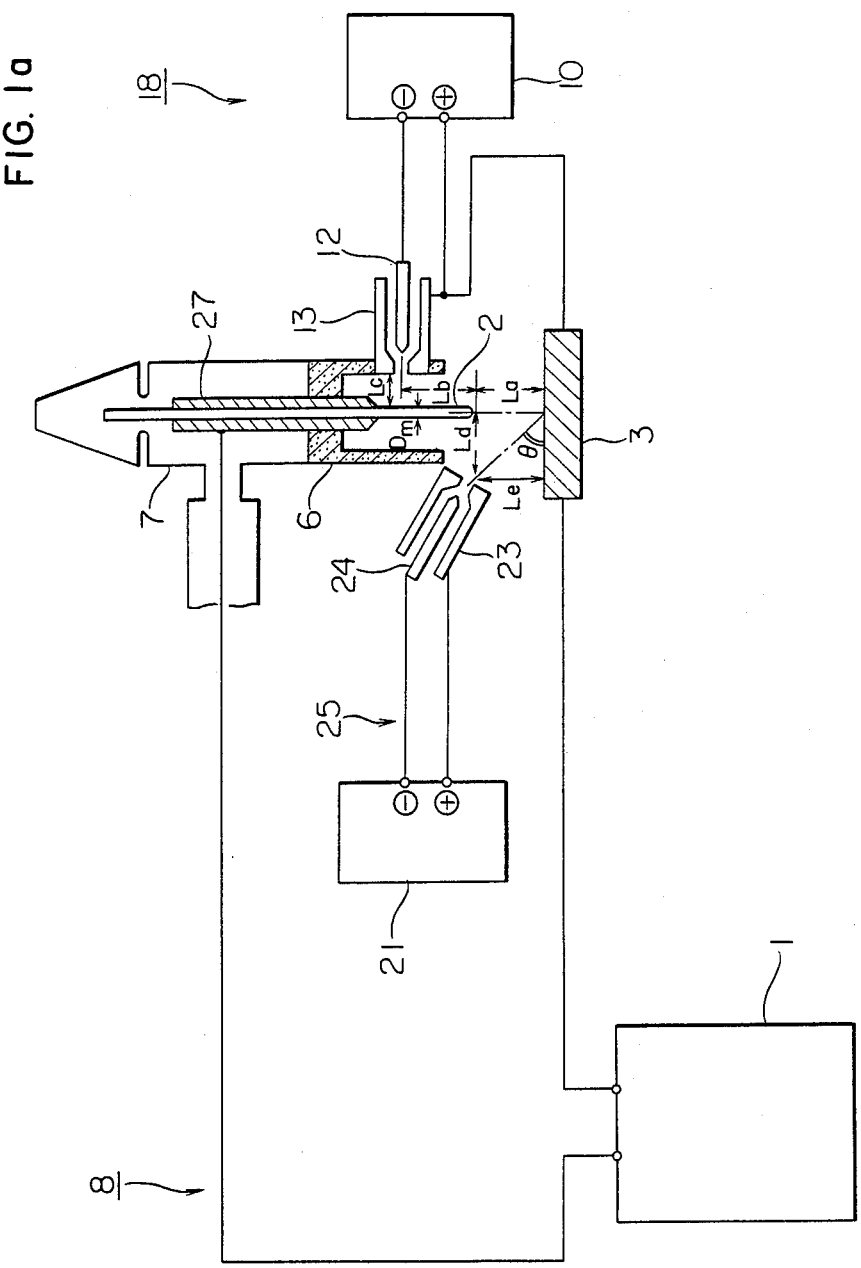

METHOD OF IGNITING ARCS BY PROJECTION OF IGNITION-PLASMA TO THE CATHODE

BACKGROUND OF THE INVENTION

(1) Field of the Invention

This invention relates to a method of igniting arcs which is suitable for use in producing an electric discharge between at least one main discharging electrode and a workpiece or another electrode to perform, by the heat generated by the electric discharge, a welding, cutting, metallization or heating operation on the workpiece.

(2) Description of the Prior Art

Heretofore, several methods have been available to produce an arc discharge. One of such methods is a high-frequency arc igniting method wherein a high-frequency high voltage is impressed between a main discharging electrode and a workpiece or another electrode to produce an arc discharge between them by causing a dielectric breakdown to occur. Another method is a contact arc igniting method wherein a main discharging electrode is brought into contact with a workpiece to produce a spark by contact and then the main discharging electrode is moved away from the workpiece to convert the spark discharge caused by contact into an arc discharge which is used for performing a desired operation on the workpiece.

Some problems are encountered in these methods of the prior art. In the high-frequency arc igniting method, the high-frequency voltage used for producing an arc is so high that an electromagnetic noise of high magnitude is produced, with a result that a microcomputer or other peripheral electronic devices incorporated in an automatic welding machine might misoperate or suffer damage. This has made it necessary to use a special noise filter to cope with the high frequency noise of high magnitude. Also, measuring equipment coupled to the arc generating circuit might suffer damage when an arc is ignited by using a high-frequency high voltage, making it impossible to readily couple the measuring equipment to the welding electric circuit. Particularly when an alternating current is used for performing welding, it is necessary to impress a high-frequency high voltage to reignite an arc for each A.C. half-wave, so that the incidence of production of a high-frequency noise of high magnitude is high.

In the contact arc igniting method, one may fail in igniting an arc depending on the shape of the forward end of the main discharging electrode and the condition of the surface of the workpiece. When welding is performed by using an alternating current, the stability of the arc may be impaired due to arc extinction which might occur when one half-wave of A.C. is switched to the other half-wave. Reigniting an arc for each half-wave of A.C. is impossible to perform by the contact arc igniting method.

SUMMARY OF THE INVENTION

(1) OBJECT OF THE INVENTION

This invention has as its object the provision of a method of igniting an arc which is capable of readily igniting an arc of high stability without substantially producing a high-frequency noise of high magnitude.

(2) STATEMENT OF THE INVENTION

The outstanding feature of the invention enabling the aforesaid object to be accomplished is that an electric field is created in the vicinity of at least one main discharging electrode and a workpiece or another electrode and ignition-plasma is introduced into the cathode of the electric field, to thereby ignite an arc for performing a desired operation.

In the method according to the invention, either the main electrode or the workpiece may serve as a cathode. Stated differently, the polarity may be either straight or reversed.

FIG. 5 shows a straight polarity arrangement in which an electrode is positioned to face a workpiece, and a direct current power source for producing an arc has the electrode connected to its negative terminal and the workpiece connected to its positive terminal. A perforated electrode is positioned to face the side of the electrode and grounded together with the workpiece, so as to create an electric field oriented from the perforated electrode toward the electrode to introduce ignition-plasma into the electrode through a hole in the perforated electrode, as indicated at ① in the figure. This produces a cathode spot on the electrode to allow an arc to be ignited from the electrode to the perforated electrode, as indicated at ② in the figure. Then, the cathode spot shifts to the forward end of the electrode, as indicated at ③ in the figure, depending on a flow of shield gas (Qs) and/or the shape of the electric field. Thus, an arc is ignited, as indicated at ④ in the figure, between the electrode and the workpiece.

Influences exerted by the electric field on the shifting of the cathode spot will be described. FIGS. 6a and 6b show one example of the relation between the geometrical arrangement of the workpiece, electrode and perforated electrode and the presence or absence of an arc ignited between the electrode and the workpiece. As seen in FIG. 6, the arc ignited is greatly influenced by the position of the perforated electrode. In the figure, marks x, o, Δ and □ indicate that no arc is ignited, an arc is ignited (the arc indicated at ② shifts quickly to the arc indicated at ④ in FIG. 5 within one second), the arc ignited shifts from ② to ④ in FIG. 5 slowly and the arc indicated at ② in FIG. 5 does not shift to the arc indicated at ④ in FIG. 5, respectively. It is the shape of the electric field in the vicinity of the electrode, workpiece and perforated electrode that shows a change as shown in FIG. 6b depending on the position of the workpiece, the electrode and the grounded perforated electrode. It would be considered that the deformation of the electric field causes the cathode spot to shift.

In the case of a reverse polarity arrangement, no shifting of the cathode spot is required as is the case with the positive polarity arrangement because a cathode spot is formed on the workpiece as shown in FIG. 1f.

With regard to a plasma projector used for igniting an arc, when it is used for igniting an arc at high frequencies (FIG. 2b), the high-frequency voltage impressed between the electrode of plasma projector 13 (hereinafter referred to as a subelectrode) and the nozzle member of plasma projector 13 is relatively low, and a noise of high magnitude that has hitherto been produced when a high-frequency current of high voltage was applied directly to the main discharging electrode is not produced.

When an ignition-plasma is ignited by contact arc igniting (FIG. 2a), ignition-plasma is produced by bringing the subelectrode 12 into contact with the nozzle member of the plasma projector 13 and then moving them away from each other. Since the plasma is a small current of about 10 A, a waste of the subelectrode 12 is negligible.

When the plasma projector is used for igniting an arc by using a self-exothermic electrode (FIG. 2c), a non-consumable electrode having at least two terminals is used, and a current is passed through the terminals to cause the subelectrode to generate heat to produce ignition-plasma.

When the plasma projector is used for igniting an arc by the aforesaid processes, electronic equipment in the vicinity of the torch is prevented from misoperating or suffering damage. Measuring equipment can be directly coupled to the welding electric circuit.

When an arc is ignited by a contactless process, the problem encountered in the prior art that, when an arc is ignited by using a non-consumable electrode for working on metals, the tungsten electrode is consumed can be obviated. Thus, the present invention would have high industrial value.

BRIEF DESCRIPTION OF THE DRAWINGS

FIGS. 1a–1h are vertical sectional views of systems suitable for carrying the method according to the invention into practice;

DESCRIPTION OF THE PREFERRED EMBODIMENTS

Figure 1B:
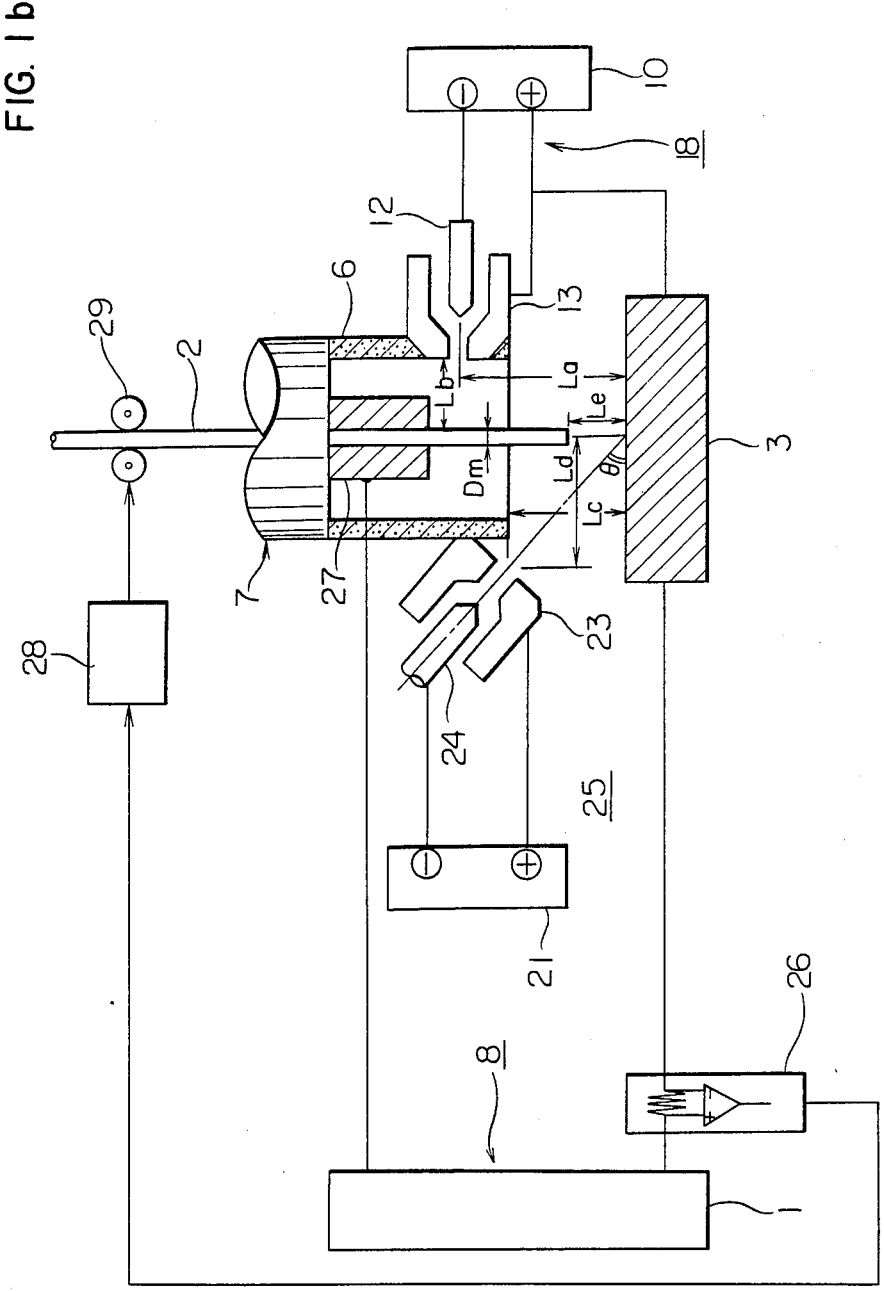

The invention will now be described in detail by referring to the accompanying drawings in which various embodiments and examples of systems suitable for carrying the method according to the invention into practice are shown.

(1) Operation Performed with an A.C. Arc using a Non-Consumable Electrode

FIG. 1a shows a system suitable for carrying one embodiment of the method according to the invention into practice or an A.C. arc welding torch of the non-consumable electrode type. As shown, the numeral 1 designates an A.C. arc welding power source which has a dooping characteristic. The arc welding power source 1 has two A.C. output terminals, one of the A.C. output terminals being connected to a tungsten electrode 2 (main discharging electrode, hereinafter referred to as a main electrode) located in a welding torch 7 and the other A.C. output terminal being connected to a workpiece 3 to be welded. The welding power source 1, main electrode 2 and workpiece 3 constitute a welding electric circuit 8. A plasma projector 13 for igniting an arc is located in the vicinity of the main electrode 2 and has an subelectrode 12 which is connected to the cathode of an ignition-plasma device 10 and a nozzle member which is connected to the anode of the ignition-plasma device 10. The ignition-plasma device 10, the subelectrode and the nozzle member of the plasma projector 13 constitute an ignition-plasma generating circuit 18. The nozzle member of the plasma projector 13 is connected to the workpiece 3.

Upon the A.C. power source 1 being turned on, an electric field is formed between the main electrode 2 and the nozzle member of the plasma projector 13 and the workpiece 3. When the output voltage of the power source 1 is a positive half-wave, the electric field is directed from the nozzle member of the plasma projector 13 and the workpiece (anode) 3 toward the main electrode (cathode) 2; when the output voltage of the power source 1 is a negative half-wave, the electric field is directed from the main electrode (anode) 2 toward the nozzle member of the plasma projector 13 and the workpiece (cathode) 3. While the electric field is being formed as aforesaid, plasma gas is supplied to the plasma projector 13 (the explanation of the plasma gas shall be omitted in the following description) and the igniting-plasma device 10 is turned on. This causes a discharge to occur between the auxiliary electrode 12 and the nozzle in the plasma projector 13 to direct the ignition-plasma toward the main electrode 2. When the output voltage of the power source 1 is a positive half-wave or when the electric field is directed from the nozzle member (anode) of the plasma projector 13 toward the main electrode 2 (cathode), positive ions in the ignition-plasma are accelerated by the electric field and impinge on the main electrode 2 to raise the temperature of the portion of main electrode 2 on which the positive ions impinge, so that an arc discharge is produced and directed from the main electrode 2 toward the nozzle member of the plasma projector 13. This arc is instantaneously transferred and ignited between the main electrode 2 and workpiece 3. Thus a welding arc is established between the main electrode 2 and workpiece 3.

Another plasma projector 23 is located in the vicinity of the workpiece and has a nozzle directed against the workpiece 3. An subelectrode 24 of the plasma projector 23 is connected to the cathode of another a ignition-plasma device 21, and a nozzle member of the plasma projector 23 is connected to the anode of the ignition-plasma device 21. The ignition-plasma device 21, the subelectrode 24 and the nozzle member of the plasma projector 23 constitute an ignition-plasma generating circuit 25.

Upon the ignition-plasma device 21 being turned on, a discharge occurs between the subelectrode 24 and the nozzle member of the plasma projector 23 to feed ignition-plasma to the workpiece 3. When the output voltage of the power source 1 is a negative half-wave, or when an electric field is formed between the main electrode (anode) 2 and the workpiece (cathode) 3 and directed from the former toward the latter, positive ions in the plasma are accelerated by the electric field and impinge on the workpiece 3 to raise the temperature of the latter, so that an arc discharge is produced and directed from the workpiece 3 toward the main electrode 2. That is, a welding arc is ignited between the workpiece 3 and main electrode 2.

From the foregoing description, it will be appreciated that, when the output (A.C.) of the welding power source 1 is a positive half-wave (main electrode, cathode; workpiece, anode), the ignition-plasma produced by the plasma projector 13 causes a welding arc to be ignited between the main electrode 2 and workpiece 3, and that, when it is a negative half-wave, the ignition-plasma produced by the plasma projector 23 causes a welding arc to be ignited between the workpiece 3 and main electrode 2.

Thus, by continuously energizing the ignition-plasma devices 10 and 21 to direct the ignition-plasma from the plasma projectors 13 and 23 against the main electrode 2 and workpiece 3 respectively in performing welding, it is possible to continuously ignite an A.C. arc between the main electrode 2 and workpiece 3.

In igniting an A.C. arc as described hereinabove, the ignition-plasma generating circuits 18 and 25 each only need to have a capacity to produce a low current Non-transferred plasma of about 10 A, to ignite an arc. To produce ignition-plasma, the gas required is only plasma gas and no shield gas is required. This enables a very small size to be obtained in plasma-projectors 13 and 23. The discharge gaps between the subelectrodes 12 and 24 and the nozzle members of the plasma projectors 13 and 23 respectively as well as the shape and material of the subelectrodes 12 and 24 and plasma projectors 13 and 23 can be selected to suit the condition for producing a discharge. The generation of ignition-plasma is only necessary when the ignition-plasma is used at a low currency level. This markedly reduces waste which might be caused to the subelectrodes 12 and 24 and the nozzle members of the plasma projectors 13 and 23.

The introduction of ignition plasma for igniting an arc or the projection of ignition-plasma from the plasma projectors 13 and 23 against the main electrode 2 and workpiece 3 respectively may be performed in synchronism with alternation of the output voltage of the welding power source 1 to time with the production of an arc of positive half-wave or an arc of negative half-wave or to match a sufficiently wide range of phase section to cover a zero cross point of the alternating current. The electric power required to maintain an ignition-plasma in a steady-state condition is so low that it is preferable to cause ignition-plasma to be produced at all times while welding is being performed, from the point of view of simplifying the construction of the ignition-plasma generating circuits 18 and 25, particularly that of the ignition-plasma devices 10 and 21.

The construction of the ignition-plasma devices 10 and 21 shown in FIG. 1a and the processes for producing a plasma jet by means of the plasma projectors 13 and 23 shown in FIG. 1a will be described by referring to FIGS. 2a 2b and 2c.

Figure 2A:
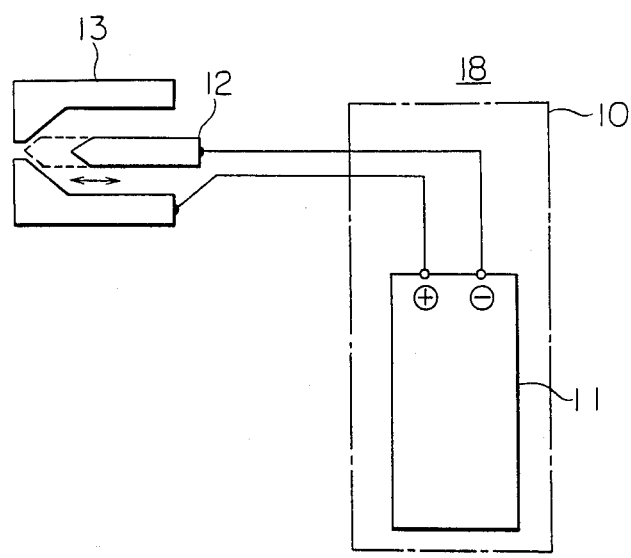
FIG. 2a is a block diagram of the ignition-plasma generating circuit used when the plasma projectors shown in FIGS. 1a–1h are of the contact arc igniting type.

FIG. 2a shows in a block diagram the ignition-plasma generating circuit 18 (25) of the contact arc igniting type. The numeral 11 designates a plasma power source having a D.C. drooping characteristic. The plasma power source 11 has the subelectrode 12 connected to its cathode and the nozzle member of the plasma projector 13 connected to its anode. The plasma power source 11, subelectrode 12 and the nozzle member of the plasma projector 13 constitute an ignition-plasma generating circuit. To produce an ignition-plasma by using the ignition-plasma generating circuit of the aforesaid construction, plasma power source 11 is turned on to impress a no-load voltage between the subelectrode 12 and the nozzle member of the plasma projector 13. While being in this condition, the subelectrode 12 is brought into contact with the nozzle member of the plasma projector 13 manually, electrically or by using known means, such as a bimetal strip or a spring, to cause a short-circuit to take place. After a transient current is passed by the short-circuiting, the subelectrode 12 is moved away from the nozzle member of the plasma projector 13 to generate an ignition-plasma. In the contact arc igniting process of the prior art (the process for igniting a main welding arc), the problem that an excessively large current produced by short-circuiting brings about a waste of the forward end portion of the main electrode was encountered. The current used to generate an ignition-plasma for igniting an arc is low (about 10 A), so that the waste of the forward end portion of the subelectrode is very small in the method according to the invention. Even if the forward end portion of the subelectrode 12 were wasted slightly, this poses no serious problem with regard to welding, because the ignition-plasma generating circuit aims at the generation of an ignition-plasma and is not required to contribute to the welding arc current, so that the circuit has essentially nothing to do with the welding electric circuit 8.

Figure 2B:
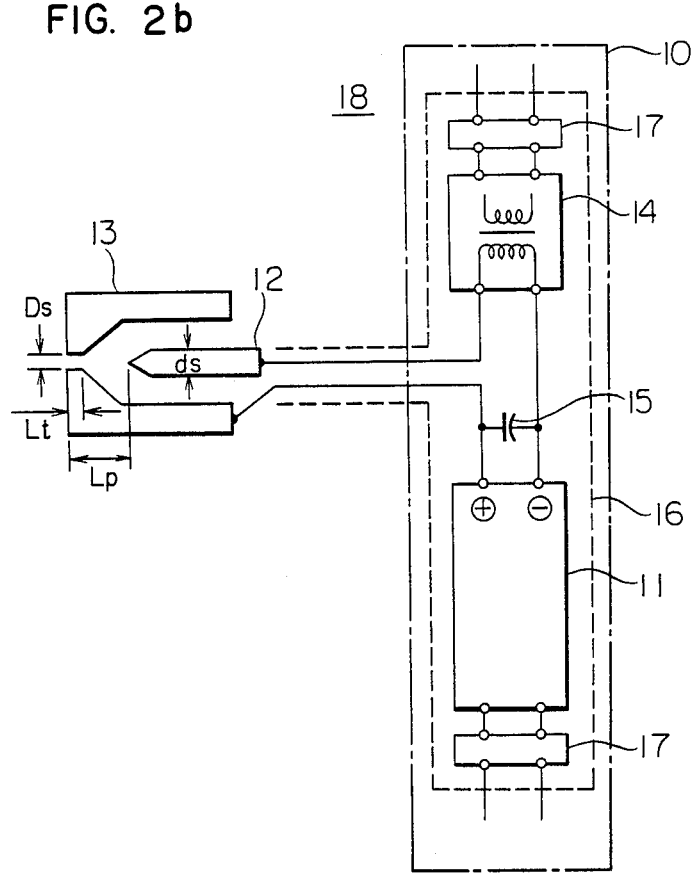
FIG. 2b is a block diagram of the ignition-plasma generating circuit used when the plasma projectors shown in FIGS. 1a–1h are of the high-frequency arc igniting type.

FIG. 2b shows in a block diagram the ignition-plasma generating circuit 18 (25) using a high-frequency arc igniting process. The numeral 11 designates a plasma power source having a D.C. drooping characteristic. The plasma power source 11 has the subelectrode connected to its cathode through a high-frequency power source 14 and the nozzle member of the plasma projector 13 connected to its anode. The numeral 15 designates a high-frequency bypass capacitor. The plasma power source 11, the subelectrode 12, the nozzle member of the plasma projector 13, high-frequency power source 14 and high-frequency bypass capacitor 15 constitute the ignition-plasma generating circuit 18 (25).

In the circuit 18 (25), a high-frequency voltage is impressed by the high-frequency power source 14 between the subelectrode 12 and the nozzle member of the plasma projector 13 to produce a spark discharge to cause dielectric breakdown to take place. Then, an electric current is passed from the plasma power source 11 to ignite an arc. The discharge gap between the nozzle member of the plasma projector 13 and subelectrode 12 can be as small as about 0.1 mm, so that the output voltage of the high frequency power source 14 only need to be about 1000V. Thus, the high-frequency noise level is very low. Therefore, when the ignition-plasma generating circuit 13 shown in FIG. 2b (used as the circuit 18, 25 shown in FIG. 1a) is covered with a shield 16 and connected to an outside power source through a noise filter 17, the high-frequency noise can be readily and fully suppressed.

It is not essential that the high-frequency power source 14 be connected to the cathode of the plasma power source 11. So long as the subelectrode 12, the nozzle member of the plasma projector 13, high-frequency power source 14 and high-frequency bypass capacitor 15 constitute a circuit, the high-frequency power source 14 may be located in any position as desired. In FIG. 2b, a high-frequency voltage produced by the high-frequency power source 14 is shown as being used for energizing the ignition-plasma generating circuit 18 (25), but any power source may be assembled in the ignition-plasma generating circuit 18 (25) so long as it is capable of producing a voltage of like level. It is possible to generate an ignition-plasma in actual practice by utilizing a capacitor discharge voltage produced by a capacitor power source or a surge voltage produced when the power supply is cut off.

Figure 2C:
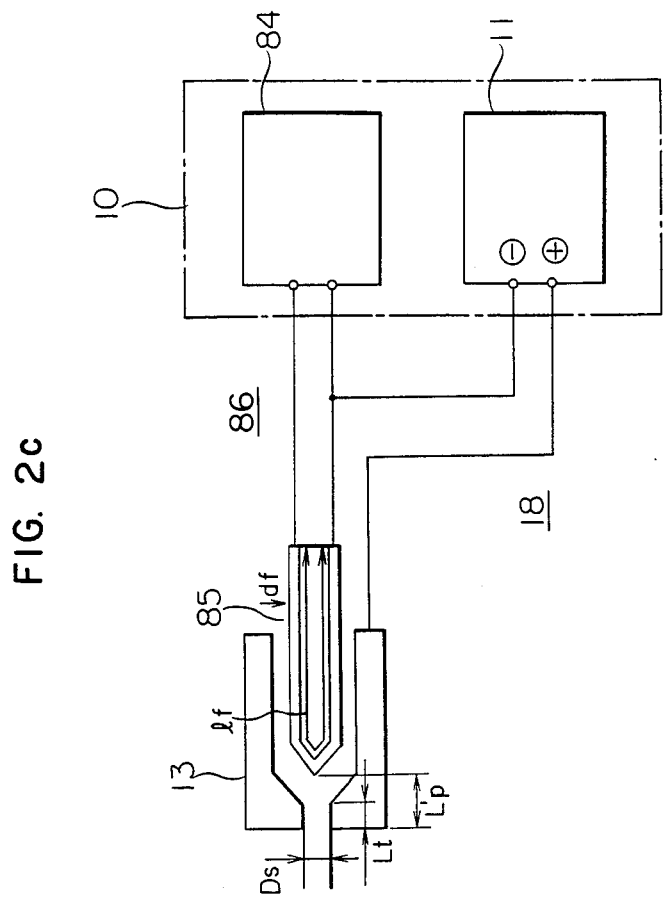
FIG. 2c is a block diagram of the ignition-plasma generating circuit used when the plasma projectors shown in FIGS. 1a–1h are of the self-exothermic electrode arc igniting type.

FIG. 2c shows in a block diagram the ignition-plasma generating circuit 18 (25) of the self-exothermic electrode arc igniting type.

The numerals 85 and 84 designate a non-consumable electrode having two terminals (the non-consumable electrode having two terminals is used as an example and shall hereinafter be referred to as a filament) and a filament heating power source to cause the filament to generate heat. The filament heating power source 84 for heating the filament 85 may be either A.C. or D.C. and of any polarity. The filament heating power source 84 is connected to the terminals of the filament 85. One end of the filament 85 is connected to the cathode of the plasma power source 11 and the nozzle member of the plasma projector 13 is connected to the anode of the plasma power source 11.

The filament heating power source 14 and filament 85 constitute a filament heating circuit 86, and the plasma power source 11, filament 85 and the nozzle member of the plasma projector 13 constitute the ignition-plasma generating circuit 18 (25).

The plasma power source 11 is turned on and a no-load voltage is impressed between the filament 85 and the nozzle member of the plasma projector 13 to produce an electric field directed from the nozzle member of the plasma projector 13 toward the filament 85. Then, the filament heating power source 84 is turned on to pass a current to the filament 85 to cause the filament 84 to generate heat by the Joule effect.

As the temperature of the filament 85 rises, the energy of the electrons in the filament 85 increases. When the sum of this energy and the energy of the electric field reaches a level sufficiently high to release the electrons, an arc is ignited between the filament 85 and the nozzle member of the plasma projector 13.

One example of the use of the ignition-plasma generating circuit 18 shown in FIG. 2b as the ignition-plasma generating circuits 18 and 25 shown in FIG. 1a will be described.

Various parts of the welding torch (see FIG. 1a) 7 had the following dimensions: La=3 mm, Lb=4 mm, Lc=5 mm, Ld=5 mm, Le=5 mm, Dm=1.6 mm and $\theta$=45°. Various parts of the ignition-plasma generating circuits 18 and 25 (see FIG. 2b) had the following dimensions: ds=1.0 mm, Ds=1.0 mm, Lt=1.0 mm and Lp=2.0 mm. An welding arc was ignited under the following conditions: the no-load voltage of welding power source 1, 50V; the flow rate of shield gas, 20 l/min Ar; the ignition-plasma current (continuously passed), 10 A; and the flow rate of plasma gas, 3.0 l/min Ar. An arc was ignited (when the operation was started) and reignited (for each positive half-wave and negative half-wave of A.C. after the operation was started or continuous are igniting) satisfactorily. The high-frequency noise level was very low, and no misoperation occurred in the computer system located in the vicinity of the welding torch 7.

One example of the use of the ignition-plasma generating circuit 18 shown in FIG. 2c (with the plasma projections 13 and 23 of the construction shown in FIG. 4) as the ignition-plasma generating circuits 18 and 25 shown in FIG. 1a will be described.

Various parts of the welding torch (see FIG. 1a) 7 had the following dimensions: La=3 mm, Lb=4 mm, Lc=5 mm, Ld=5 mm, Le=5 mm, Dm=1.6 mm and $\theta$=45°. Various parts of the ignition-plasma generating circuit 18 and 25 (see FIG. 2c) had the following dimensions: df=0.5 mm, lf=50 mm, Ds=1.0 mm, Lt=1.0 mm and Lp=2.0 mm. The filament 85 was formed of tungsten containing 2% thorium. A welding arc was ignited under the following conditions: the no-load voltage of welding power source 1, 50V; the flow rate of shield gas, 20 l/min Ar; the ignition-plasma current (continuously passed), 10 A; the flow rate of plasma gas, 3.0 l/min Ar; and the filament heating current, D.C. 25 A.

The filament heating current may be continuously passed after ignition-plasma has been generated. However, the filament heating current supply is preferably stopped immediately after the generation of ignition-plasma, to prolong the service life of the filament 85. An arc was ignited (when the operation started) and reignited (for each positive half-wave and negative half-wave of A.C. after the operation was started or continuous arc igniting) satisfactorily. No misoperation occurred in the computer system located in the vicinity of the welding torch 7.

As described in detail hereinabove, the need to use a high-frequency power source and other means directly connected to the arc welding circuit in the prior art which has tended to produce a noise of high magnitude is eliminated when an arc is ignited by using an A.C. arc welding torch of the non-consumable electrode type. This eliminates the need to provide a measuring device or a control unit using a microcomputer or other electronic equipment with means for coping with the production of noises of high level. To ignite an arc, it is not necessary to bring a non-consumable electrode into contact with the workpiece, so the non-consumable electrode is not wasted. A voltage or current for igniting an arc is not superposed on the welding electric circuit. Thus, means for sensing the voltage or current can be connected to the arc power source, and measuring equipment can be connected to the sensing means. There is no risk that the measuring equipment might be damaged.

(2) Operation Performed with a D.C. Straight Polarity Arc Using a Non-Consumable Electrode FIG. 1a shows an A.C. arc welding torch of the non-consumable electrode type as a system suitable for carrying the method according to the invention into practice. When it is desired to convert this welding torch into an arc welding torch of the D.C. nonconsumable electrode type in which the workpiece 3 has a positive polarity, one only has to eliminate the plasma projector shown in FIG. 1a and mount the plasma projector 13 on a shield cap 6 so that the plasma ejection port is directed against the main electrode 2.

One example of the use of the ignition-plasma generating circuit 18 shown in FIG. 2b as the ignition-plasma generating circuit 18 shown in FIG. 1e will be described.

Attempts were made to ignite arcs continuously for 100 times by projecting ignition-plasma for 0.1 second each time under the following conditions:

In the ignition-plasma generating circuit:

| | |
|---|---|
| No-load voltage impressed by | 100 V |

-continued

| | |
|---|---|
| plasma power source 11 | |
| Ignition-plasma current | 10 A |
| Flow rate of plasma gas | 3 l/min Ar |
| Ds = 1.0 mm, Lt = 1.0 mm, Lp = 2.0 mm and | |
| Ds = 1.0 mm | |

Ds=1.0 mm, Lt=1.0 mm, Lp=2.0 mm and Ds=1.0 mm
In the welding electric circuit:

| | |
|---|---|
| No-load voltage impressed by welding power source 1 | 47 V |
| Predetermined welding current | 50 A |
| Flow rate of shield gas | 20 l/min Ar |
| La = 2 mm, Lc = 5 mm, Lb = 10 mm and Dm = 2.4 mm | |

La=2 mm, Lc=5 mm, Lb=10 mm and Dm=2.4 mm
The arc established each time was very stable, and no waste was observed in the main electrode 2, the subelectrode 12 and the nozzle member of the plasma projector 13.

When a high-frequency voltage was produced, almost no change occurred in the voltage of the external power source. The measuring equipment and control unit used each had a microcomputer built therein. It was noted that no misoperation occurred in them due to a high-frequency noise.

(3) Operation Performed with a D.C. Reverse Polarity Arc Using a Non-Consumable Electrode Another system suitable for carrying the method according to the invention into practice or a D.C. arc welding torch of the non-consumable electrode type in which the workpiece 3 has a negative polarity will be described. To obtain such arc welding torch, one only has to eliminate the plasma projector 13 shown in FIG. 1a and mount the plasma projector 23 on the shield cap 6 so that the plasma projection port is directed against the workpiece 3.

One example of the use of the ignition-plasma generating circuit 18 shown in FIG. 2b as the ignition-plasma generating circuit 18 shown in FIG. 1f will be described.

Attempts were made to ignite arcs continuously for 100 times by projecting the ignition-plasma for 0.1 second each time under the following conditions:
In the ignition-plasma generating circuit:

| | |
|---|---|
| No-load voltage impressed by plasma power source 11 | 100 V |
| Ignition-plasma current | 10 A |
| Flow rate of plasma gas | 3 l/min Ar |
| Ds = 1.0 mm, Lt = 1.0 mm, Lp = 2.0 mm and | |
| Ds = 1.0 mm | |

Ds=1.0 mm, Lt=1.0 mm, Lp=2.0 mm and ds=1.0 mm
In the welding electric circuit:

| | |
|---|---|
| No-load voltage impressed by welding power source 1 | 47 V |
| Predetermined welding current | 50 A |
| Flow rate of shield gas | 20 l/min Ar |
| La = 2 mm, Lc = 5 mm, Lb = 10 mm and Dm = 2.4 mm | |

La=2 mm, Ld=5 mm, Le=5 mm, Dm=3.2 mm and $\theta=45°$.

The arc established each time was very stable, and no waste was observed in the main electrode 2, the subelectrode 24 and the nozzle member of the plasma projector 23. When a high-frequency voltage was produced, almost no change occurred in the voltage of the external power source. The measuring equipment and control unit used with this torch each had a microcomputer built therein. It was noted that no misoperation occurred in them due to a high-frequency noise.

(4) Operation Performed with an A.C. Arc Using a Consumable Electrode

FIG. 1b shows another system suitable for carrying out the method according to the invention into practice or an A.C. arc welding torch of the consumable electrode type. In FIG. 1b, the A.C. welding power source 1 has two output terminals, one of the output terminals being connected to a welding wire (main discharging electrode) 2 of the welding torch 7 and the other output terminal being connected to the workpiece 3 to be welded. Thus, the welding power source 1, main discharging electrode 2 and workpiece 3 constitute a welding electric circuit 8. Located in the vicinity of the main electrode 2 is the plasma projector 13 for igniting an arc having a nozzle member connected to the anode of ignition-plasma device 10, and the subelectrode 12 is connected to the cathode of the ignition-plasma device 10. The ignition-plasma device 10, subelectrode 12 and the nozzle member of the plasma projector 13 constitute an ignition-plasma generating circuit 18. The nozzle member of the plasma projector 13 is connected to the workpiece.

The numerals 26 and 28 designate an arc detector for detecting an arc established by the welding current and a welding wire feed control unit for driving feed rollers 29 respectively. The arc detector 26 detects that an arc is ignited and produces a signal for actuating the welding wire feed control unit 28 to commence the feeding of the welding wire 2. Upon the A.C. power source 1 being turned on while the forward end portion of the welding wire is kept slightly away from the workpiece 3, an electric field is formed between the main electrode 2 and the nozzle member of the plasma projector 13 and the workpiece 3. The electric field is directed from the nozzle member of the plasma projector 13 and the workpiece (anode) 3 toward the main electrode (cathode) 2 when the output voltage of the power source 1 is a positive half-wave and directed from the main electrode (anode) 2 toward the nozzle member of the plasma projector 13 and the workpiece (cathode) 3 when the output voltage of the power source 1 is a negative half-wave.

While the electric field is being formed as aforesaid, plasma gas is supplied to the plasma projector 13 and the ignition-plasma device 10 is turned on. This causes a discharge to occur between the subelectrode 12 and the nozzle member of the plasma projector 13, to direct the ignition-plasma toward the main electrode 2. When the output voltage of the power source 1 is a positive half-wave or when the electric field is directed from the nozzle member of the plasma projector 13 and workpiece (anode) 3 toward the main electrode (cathode) 2, positive ions in the plasma are accelerated by the electric field and impinge on the main electrode 2 to raise the temperature of the portion of the main electrode 2 on which the positive ions impinge, so that an arc discharge is produced and directed from the main electrode 2 toward the nozzle member of the plasma projector 13. This arc is instantaneously transferred and ignited between the main electrode 2 and workpiece 3. Thus, a welding arc is established between the main electrode 2 and workpiece 3.

The other plasma projector 23 is arranged in the vicinity of the workpiece 3, and the subelectrode 24 is connected to the cathode of the ignition-plasma device 21 and the nozzle member of the plasma projector 23 is connected to the anode of the device 21. The ignition-plasma device 21, the subelectrode 24 and plasma projector 23 constitute the ignition-plasma generating circuit 25.

Upon the ignition-plasma device 21 being turned on, a discharge occurs between the subelectrode 24 and the nozzle member of the plasma projector 23 to project plasma against the workpiece 3. When the output voltage of the power source 1 is a negative half-wave or when an electric field is formed and directed from the main electrode 2 (anode) toward the workpiece 3 (cathode), positive ions in the plasma are accelerated by the electric field and impinge on the workpiece 3 to raise its temperature and causes an arc discharge to be produced and directed toward the main electrode 2 from the workpiece 3. Thus, a welding arc is ignited between the workpiece 3 and main electrode 2.

As described hereinabove, a welding arc is ignited between the main electrode 2 and workpiece 3 by ignition-plasma generated by the ignition-plasma generating circuit 18 when the output (A.C.) of the welding power source 1 is a positive half-wave (main electrode, cathode; workpiece, anode) and the ignition-plasma generated by the ignition-plasma generating circuit 25 when the output (A.C.) of the welding power source 1 is a negative half-wave (main electrode, anode; workpiece, cathode).

Thus, when welding is performed, an A.C. arc can be continuously established between the main electrode 2 and workpiece 3 by continuously energizing the ignition-plasma devices 10 and 25 to project the ignition-plasma from the plasma projectors 13 and 23 against the main electrode 2 and workpiece 3 respectively.

One example of using the ignition-plasma generating circuit 18 shown in FIG. 2b as the ignition-plasma generating circuits 18 and 25 shown in FIG. 1b will be described.

Various parts of the welding torch 7 had the following dimensions (see FIG. 1b): La=10 mm, Lb=4 mm, Lc=5 mm, Ld=5 mm, Le=3 mm, Dm=1.2 mm and $\theta$=45°. Various parts of the ignition-plasma generating circuits 18 and 25 had the following dimensions (see FIG. 2b): ds=1.0 mm, Ds=1.0 mm, Lt=1.0 mm and Lp=2.0 mm. A welding arc was ignited under the following conditions: no-load voltage of the welding current 1, 50V; flow rate of shield gas, 20 l/min Ar; ignition-plasma current (continuously passed), 10 A; and flow rate of plasma, 3.0 l/min Ar. An arc was ignited (when the operation started) and reignited (for each positive half-wave and negative half-wave of A.C. after the operation was started or continuous arc igniting) satisfactorily. No misoperation occurred in the computer system located in the vicinity of the welding torch 7. What is worthy of note is that initial arc igniting was achieved by the projection of the ignition-plasma when welding was started, without requiring to rely on a contact arc igniting process. When the contact arc igniting process is used, one may fail in igniting an arc depending on the shape of the forward end of the main electrode 2 or the condition of the surface of the workpiece 3. However, the projection of the ignition-plasma ensures that initial arc igniting is achieved stably without any trouble. The system described hereinabove can achieve the same effects as the system shown in FIG. 1a.

The method described hereinabove is concerned with the use of a single electrode for igniting an arc. However, the invention is not limited to the use of a single electrode for igniting an arc, and it may have application in an arc welding method using a plurality of electrodes. When the operation is started with a plurality of electrodes, there is no need to provide each electrode with a plasma projector, and only one plasma projector may be provided and used sequentially to ignite an arc.

(5) Operation Performed with a D.C. Straight Polarity Using a Consumable Electrode FIG. 1b shows an A.C. arc welding torch using a consumable electrode. When it is desired to use this torch in a D.C. welding system in which the workpiece 3 is an anode, one only has to eliminate the plasma projector 23 shown in FIG. 1b and mount the plasma projector 13 on the shield cap 6.

One example of the use of the ignition-plasma generating circuit 18 shown in FIG. 2b as the ignition-plasma generating circuit 18 shown in FIG. 1g will be described.

Attempts were made to ignite arcs continuously for 100 times by projecting ignition-plasma for 0.1 second each time under the following conditions:

In the ignition-plasma generating circuit:

| | |
|---|---|
| No-load voltage impressed by plasma power source 11 | 100 V |
| Ignition-plasma current | 10 A |
| Flow rate of plasma gas | 3 l/min Ar |
| Ds = 1.0 mm, Lt = 1.0 mm, Lp = 2.0 mm and Ds = 1.0 mm | |

Ds=1.0 mm, Lt=1.0 mm, Lp=2.0 mm and ds=1.0 mm
In the welding electric circuit:

| | |
|---|---|
| Welding power source 1 impressed a no-load voltage of 47 V having a drooping characteristic of 0.07 V/A. | |
| Flow rate of shield gas | 20 l/min Ar |
| Wire feeding speed | 10 m/min |

Dm=1.2 mm (solid wire) Le=2 mm, La=10 mm and Lb=5 mm

In each case, the arc established each time was very stable, and no sputter of large size was produced when arcs were ignited.

(6) Operation performed with a D.C. Reverse Polarity Using a Consumable Electrode When it is desired to convert the welding torch shown in FIG. 1b to a D.C. welding torch of a system in which the workpiece has a negative polarity, one only has to eliminate the plasma projector 13 shown in FIG. 1b and mount the plasma projector 23 on the shield cap 6.

One example of the use of the ignition-plasma generating circuit 18 shown in FIG. 2b as an ignition-plasma generating circuit 25 shown in FIG. 1h will be described.

Attempts were made to ignite arcs repeatedly for 100 times continuously by projecting the ignition-plasma for 0.1 second each time under the following conditions:

In the ignition-plasma generating circuit:

| | |
|---|---|
| No-load voltage impressed by plasma power source 11 | 100 V |
| Ignition-plasma current | 10 A |
| Flow rate of plasma gas | 3 l/min Ar |
| Ds = 1.0 mm, Lt = 1.0 mm, Lp = 2.0 mm and Ds = 1.0 mm | |

$D_S = 1.0$ mm, $Lt = 1.0$ mm, $Lp = 2.0$ mm and $ds = 1.0$ mm

In the welding electric circuit:

| | |
|---|---|
| No-load voltage applied by welding power source 1 (having a drooping characteristic of 0.07 V/A) | 47 V |
| Flow rate of shield gas | 20 l/min Ar |
| Wire feeding speed | 10 m/min |

$Le = 2$ mm, $Ld = 5$ mm, $Lc = 5$ mm, and $\theta = 45$ deg.

The arc established each time was very stable. No sputter of large size was produced.

(7) Operation Performed with Plasma

Figure 1C:
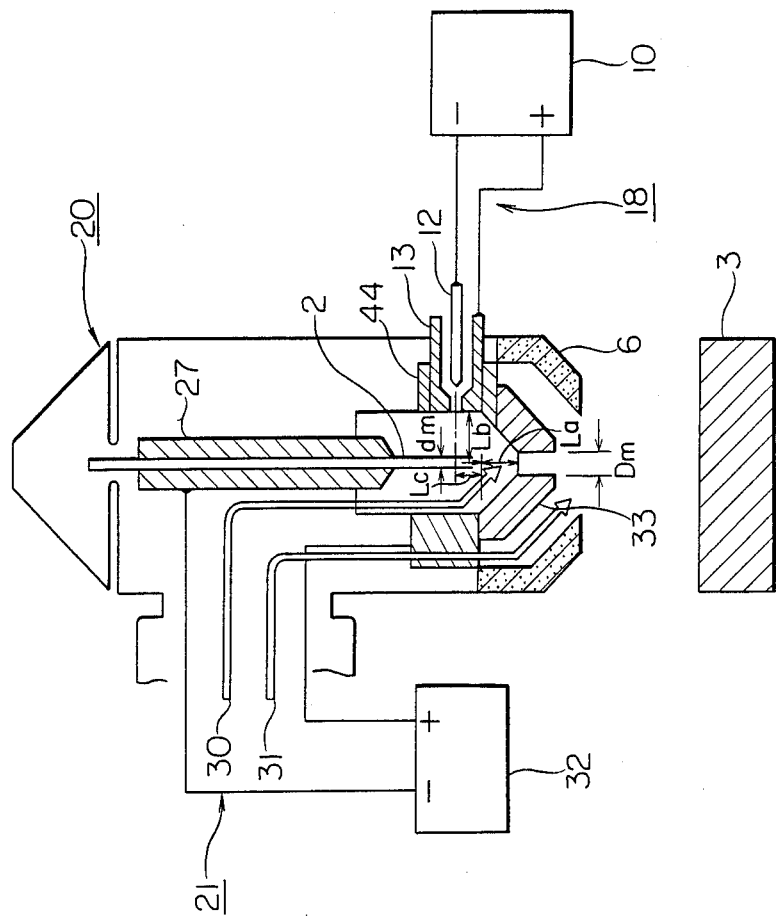

FIG. 1c shows another system suitable for carrying out the method according to the invention into practice. The system shown in FIG. 1c is a non-transferred type plasma-torch. In the figure, parts similar to those shown in FIG. 1a are designated by like reference characters. In FIG. 1c, a nozzle holder 44 supporting a main nozzle 33 is formed at its side wall with a circular opening in which the plasma projector 13 is fitted and faces the side surface of the main electrode 2. The ignition-plasma device 10 for generating ignition-plasma is connected to the plasma projector 13. In this system, the subelectrode 12 is the cathode and the nozzle member of the projector 13 is the anode. The plasma projector 13 forms a unitary structure with the main nozzle 33, so that the nozzle member of the projector 13 is the anode with respect to a working plasma power source 32.

In this system, shield gas, center gas and ignition-plasma generating gas (which may be inert gas) are fed to a shield gas line 31, a center gas line 30 and the plasma projector 13, respectively, and the plasma power source 32 which is of the non-transferred type is turned on. As a result, an electric field is formed between the main electrode 2 and main nozzle 33 and directed from the latter toward the former. Since the nozzle member of the plasma projector 13 is connected to the main nozzle 33, an electric field is formed between the nozzle member of the plasma projector 13 and main electrode 2 and directed from the former toward the latter. Then, the ignition-plasma device 10 is actuated to cause the plasma projector 13 to generate the ignition-plasma which is projected at high speed against the main electrode 2 by the ignition-plasma generating gas (inert gas) fed to the plasma projector 13. At this time, positive ions in the ignition-plasma introduced into the electric field formed between the main electrode 2 and the nozzle member of the plasma projector 13 are accelerated by the electric field and impinge on the main electrode 2 to raise the temperature of the portion of the main electrode 2 on which the positive ions impinge. Thus, a voltage impressed by the power source 1 causes a non-transferred plasma to be formed between the main electrode 2 and main nozzle 33.

In this system, a non-transferred plasma is not produced by discharge voltage of the non-transferred plasma generating circuit 21 itself but by triggering action performed by external means. Because of this, the electromagnetic noise level is low and fluctuations in the transient current are small before and after the non-transferred plasma is established. Because no arc igniting circuit is connected to the power source 32, equipment for measuring currents and voltages can be connected to the non-transferred plasma power source 21. This facilitates connection of automatic control equipment to the system.

One example of the use of the ignition-plasma generating circuit 18 shown in FIG. 2b in the system shown in FIG. 1c will be described.

Attempts were made to repeatedly ignite non-transferred plasma continuously for 100 times by projecting ignition-plasma each time for 0.1 second under the following conditions:

In the ignition-plasma generating circuit 18 (FIG. 2b):

| | |
|---|---|
| No-load voltage impressed by power source 11 | 100 V |
| Ignition-plasma current | 10 A |
| Flow rate of plasma gas | 3 l/min Ar |

$Ds = 1.0$ mm, $Lt = 1.0$ mm, $Lp = 2.0$ mm, and $ds = 1.0$ mm

In the non-transferred plasma generating circuit 21 (FIG. 1c):

| | |
|---|---|
| No-load voltage impressed by power source 1 | 100 V |
| Predetermined current | 50 A |
| Flow rate of center gas | 1.0 l/min Ar |
| Flow rate of shield gas | 50 l/min Ar |

$La = 1$ mm, $Lb = 5$ mm, $Lc = 10$ mm, $dm = 4$ mm and $Dm = 1.0$ mm

In each case, the non-transferred plasma produced was very stable and the main electrode 2, main nozzle 33, subelectrode 12 and the nozzle member of the plasma projector suffered no waste or damage. No fluctuations in the voltage of an external power source were caused to occur by the high-frequency voltages. Measuring and control equipment used with the system had a microcomputer built therein. The microcomputer showed no misoperation attributable to high-frequency noise.

Figure 1D:
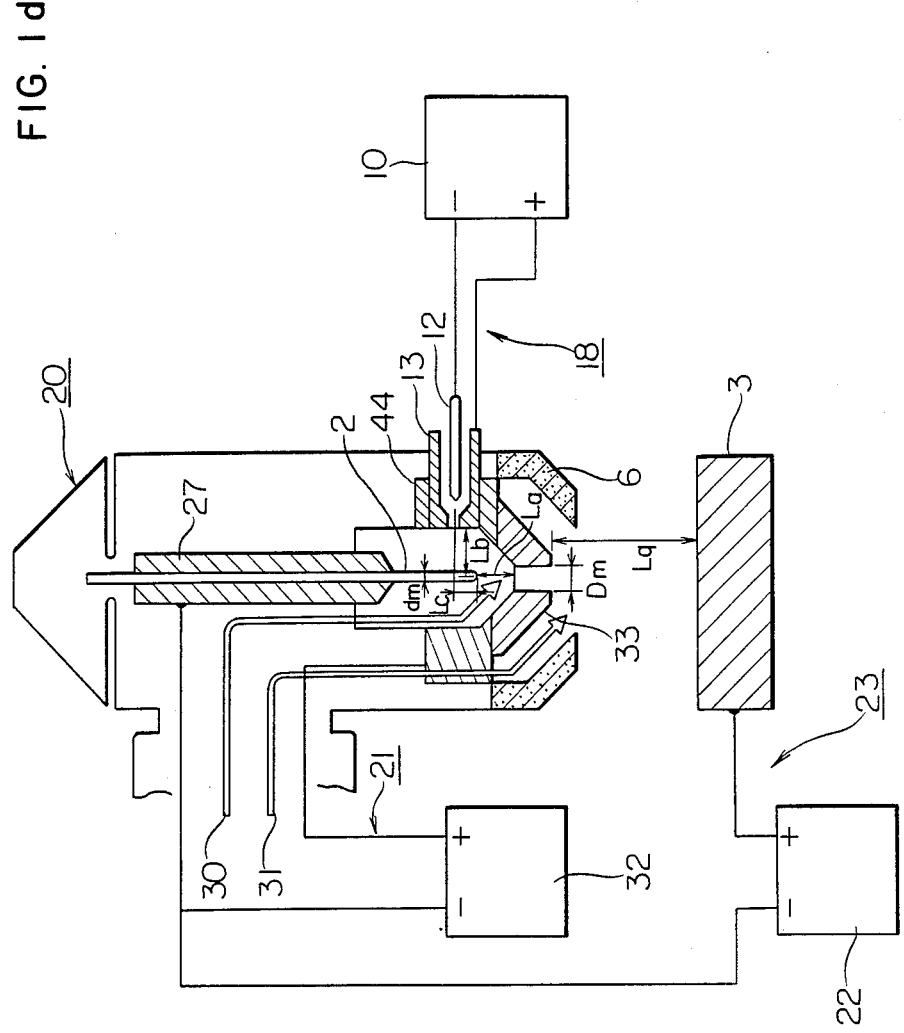
Figure 1E:
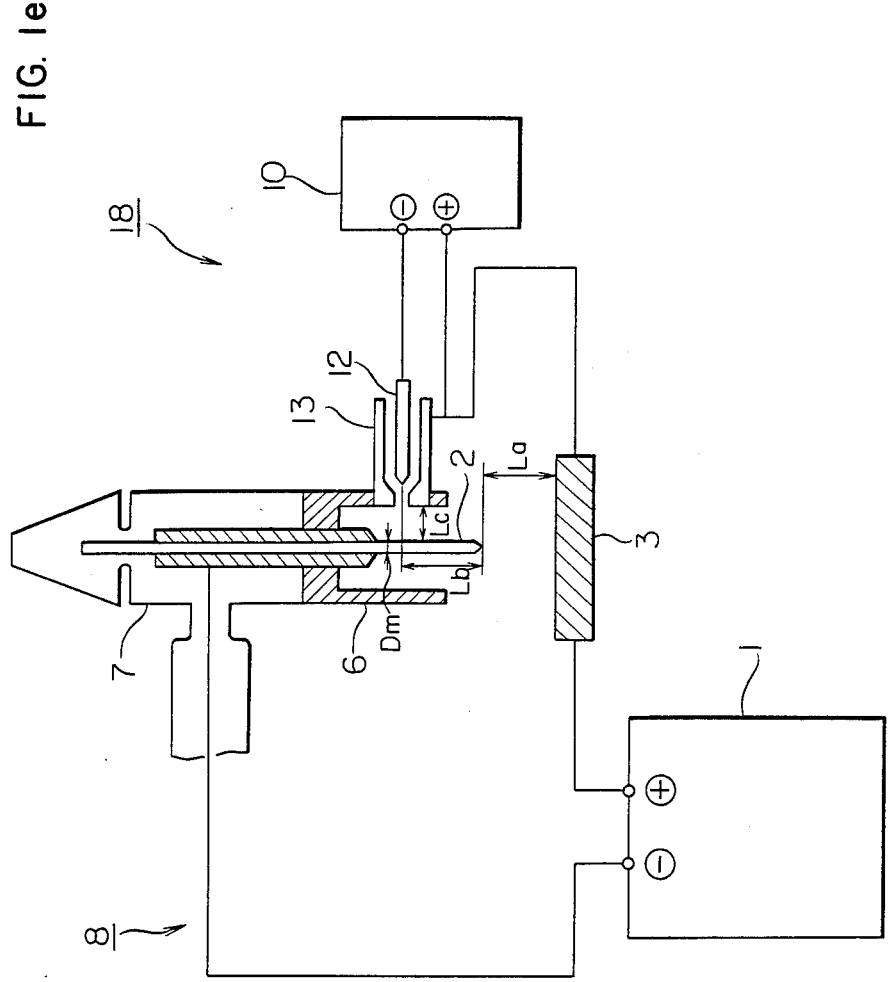
Figure 1F:
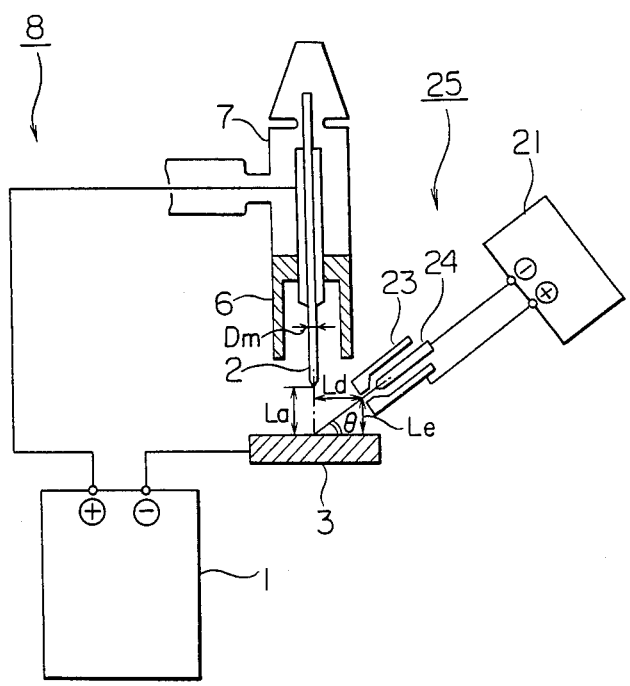
Figure 1G:
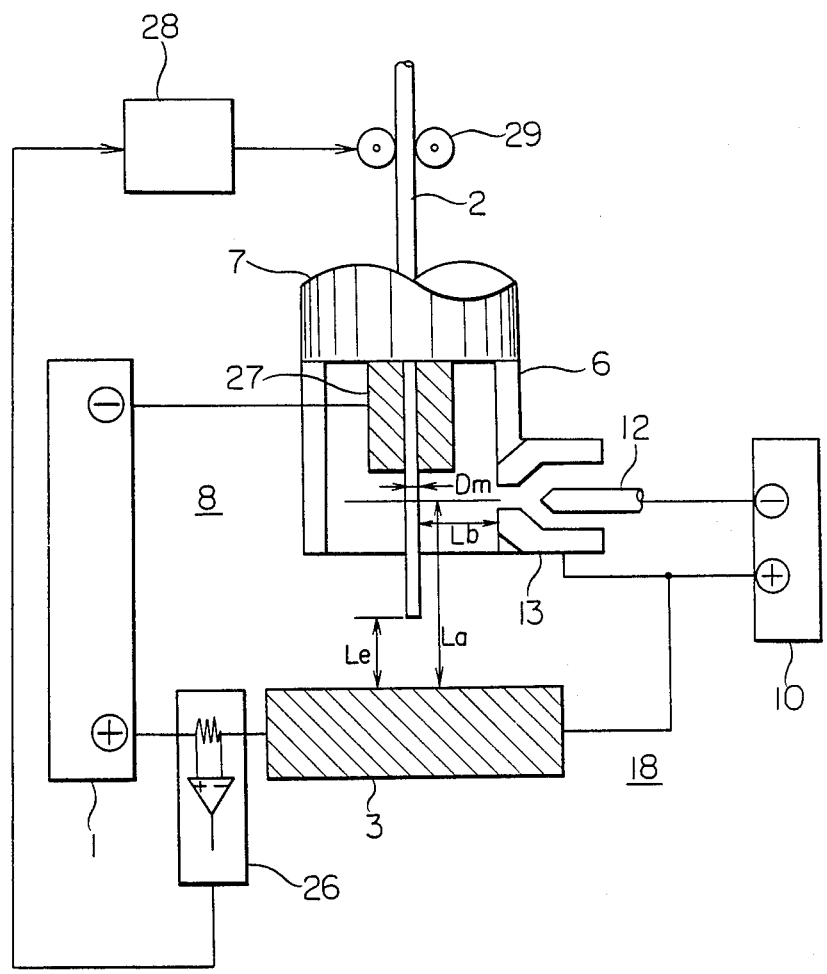
Figure 1H:
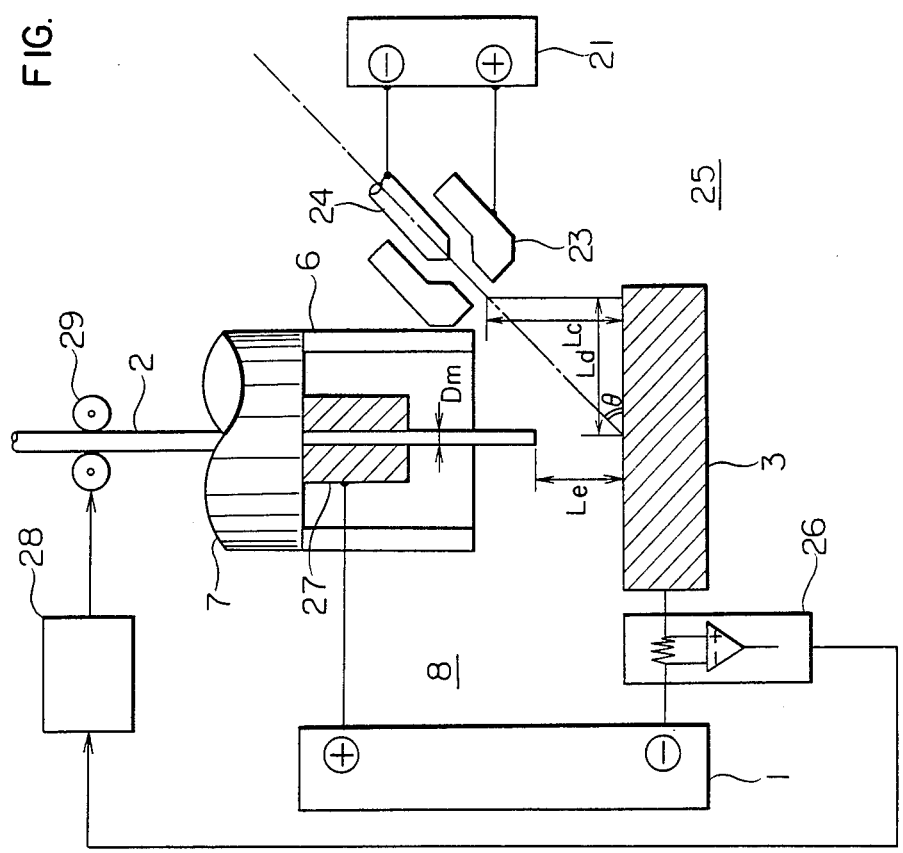

FIG. 1d shows still another system suitable for carrying the method according to the invention into practice. The system shown in the figure is a transferred plasma torch which is distinct from the system shown in FIG. 1c in that a transferred plasma power source 22 having a D.C. drooping characteristic is connected at its cathode to the main electrode 2 and at its anode to the workpiece 3.

In this system, the same process is followed as the system shown in FIG. 1c until non-transferred plasma is produced. However, substantially simultaneously as the non-transferred plasma is produced, the transferred plasma power source 22 is turned on to impress a no-load voltage between the main electrode 2 and workpiece 3 to form an electric field therebetween which is directed from the workpiece 3 toward the main electrode 2. By introducing the non-transferred plasma into the electric field, transferred plasma can be produced.

Attempts were made to repeatedly produce both the non-transferred plasma and the transferred plasma continuously for 100 times by projecting ignition-plasma each for 0.1 second by using the ignition plasma generating circuit shown in FIG. 2b as the ignition-plasma device 10 and under the same conditions as described by referring to the system shown in FIG. 1c except that Lq=3 mm is added to the conditions. The transferred plasma established each time was very stable, and no waste was observed in the main electrode 2, main nozzle 33, subelectrode 12 and the nozzle member of the plasma projector 13. When a high-frequency voltage was produced, almost no change occurred in the voltage of the external power source. The measuring equipment and control unit used each had a microcomputer built therein. It was noted that no misoperation occurred in them due to a high-frequency noise.

The foregoing description refers to a plasma torch suitable for use in performing plasma welding. However, the invention is not limited to the use of plasma in welding, and the invention can have application in plasma cutting, plasma spraying (metallization), etc., since the principle of producing plasma in these operations is the same as in plasma welding.

The system of the self-exothermic electrode arc igniting type shown in FIG. 2c may be used for performing welding, cutting, spraying (metallization), and heating, in addition to be used as the ignition-plasma generating circuit 18, 25 as described hereinabove.

Figure 3A:
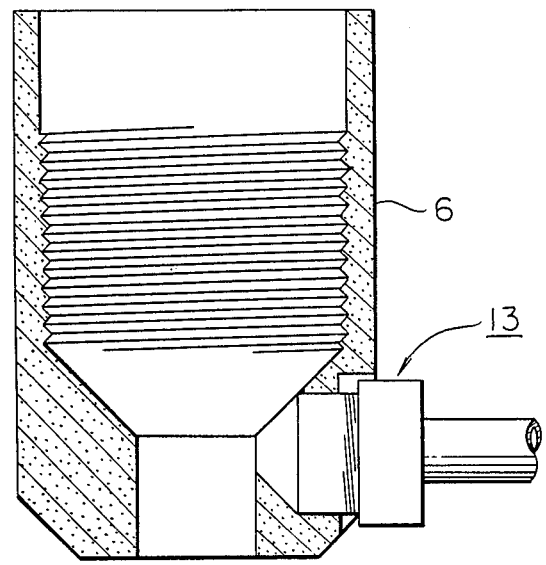
FIGS. 3a, 3b and 3c are fragmentary sectional views showing in detail the manner in which the plasma projectors shown in FIGS. 1a and 1b are mounted.

With regard to the manner in which the plasma projectors 13 and 23 are mounted, the plasma projector 23 shown in FIG. 1a may be eliminated and the plasma projector 13 may be mounted on the shield cap 6 in such a manner that its plasma ejecting port 80 faces the main electrode 2 as shown in FIG. 3a, when the system is converted to a gas-shielding D.C. arc welding torch in which the workpiece 3 has a positive polarity.

Figure 3B:
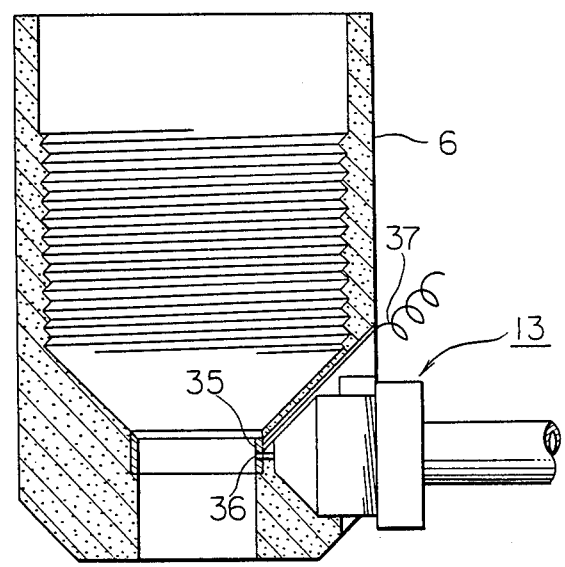

As shown in FIG. 3b, the plasma projector 13 may be insulated from the interior of the shield cap 6, and a dummy electrode 35 formed with a plasma feed port 36 communicating with the plasma ejecting port 80 of the plasma projector 13 may be attached to the inner surface of the shield cap 6. The dummy electrode 35 may be connected through a lead 37 to the workpiece 3 or the positive output terminal of the welding power source, so as to thereby electrically separate the plasma projector 13 from the workpiece 3. When the plasma projector 13 is arranged as described hereinabove, the welding electric circuit 8 is completely separated and insulated from the ignition-plasma generating circuit 18. Thus, by turning on the welding power source (D.C. output) 1, it is possible to form between the main electrode 2 and dummy electrode 35 an electric field which is directed from the latter toward the former. In this arrangement, the arc formed between the main electrode 2 and dummy electrode 35 is immediately transferred so that it is formed between the main electrode 2 and workpiece 3. A discharge from the main electrode 2 is not essentially applied to the plasma projector 13, so that the nozzle member of the latter is free from damage.

Figure 3C:
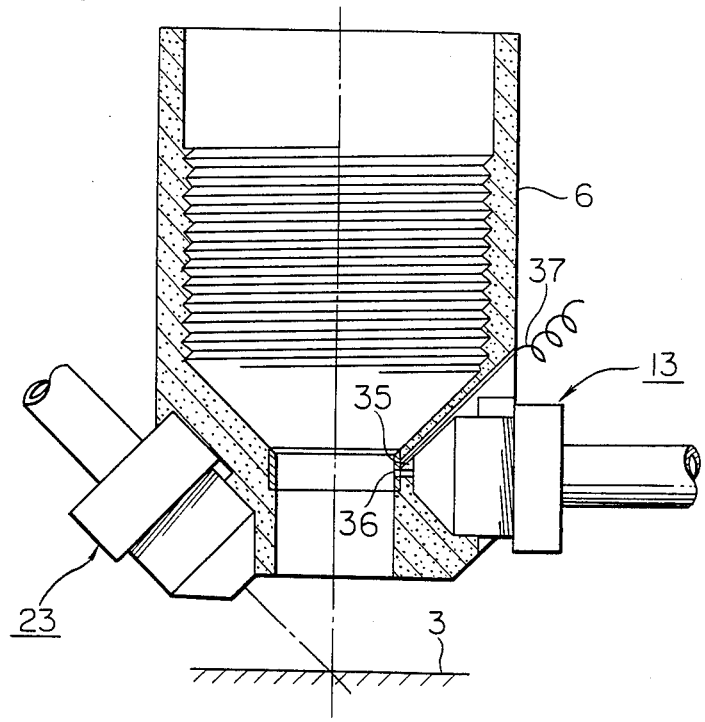

When it is desired to convert the system to a gas-shielding D.C. arc welding torch wherein the workpiece 3 has a negative polarity, one only has to eliminate the plasma projector 13 shown in FIG. 1a and mount the plasma projector 23 on the shield cap 6 in such a manner that the plasma ejecting port 80 faces the workpiece 3, as shown in FIG. 3c (13 and 35 are eliminated).

FIG. 3c shows a concrete example of the system shown in FIG. 1a (with the plasma projector 13 and workpiece being electrically non-connected) in which the plasma projectors 13 and 23 are mounted on the shield cap 6. In this concrete example, the dummy electrode 35 is used in the same manner as described by referring to the example shown in FIG. 3b in which the welding power source 1 supplies D.C. Upon the welding power source (A.C.) being turned on, an electric field is formed between the main electrode 2 and dummy electrode 35 in a half-wave in which a positive voltage is impressed on the workpiece 3. With the electric field being directed from the dummy electrode 35 toward the main electrode 2, an arc is formed between the main electrode 2 and dummy electrode 35, but this arc is immediately transferred and formed between the main electrode 2 and workpiece 3.

Figure 4:
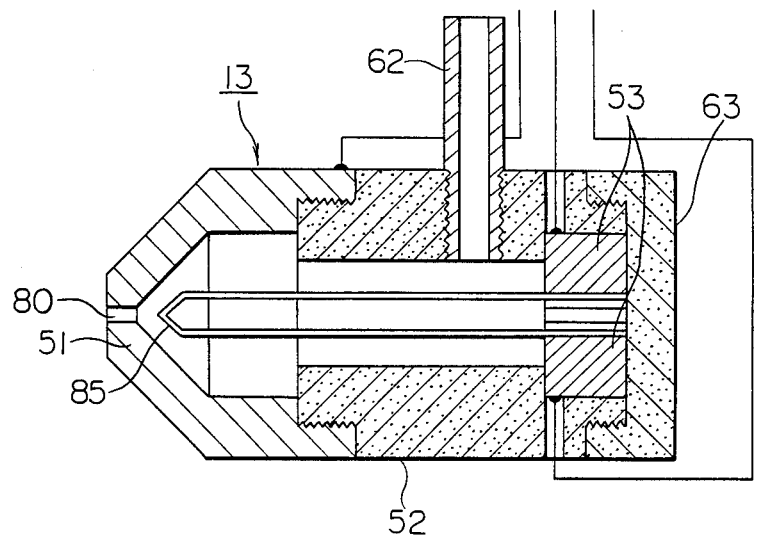
FIG. 4 is a vertical sectional view of the plasma projector according to the invention, showing its construction in detail.
Figure 5:
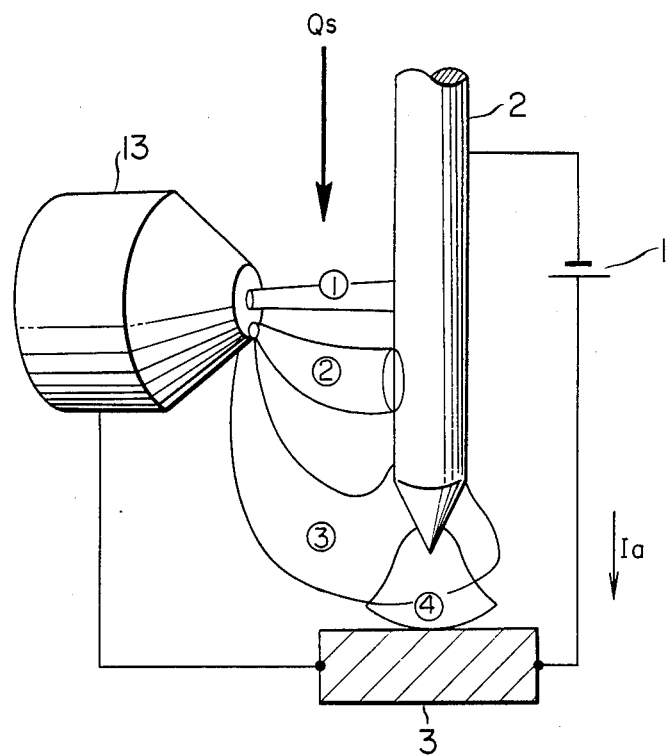
FIG. 5 is a block diagram showing the shifting of the cathode spot.
Figure 6A:
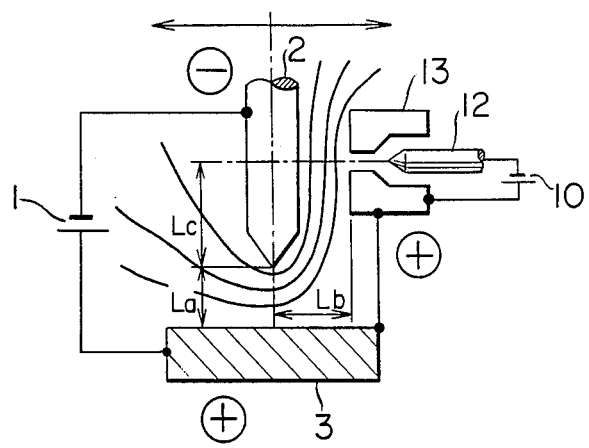
FIGS. 6a and 6b are views in explanation of the shifting in the cathode spot and the formation of an electric field in relation to the geometrical arrangement of the electrode, workpiece and perforated electrode.
Figure 6B:
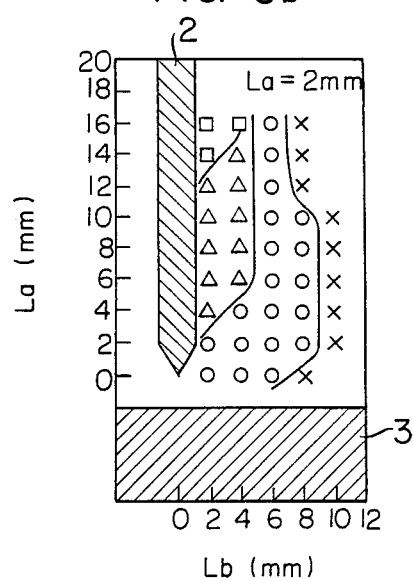

In the plasma projector 13 shown in FIG. 4, the subelectrode 12 is in the form of a non-consumable electrode (filament 85) having at least two terminals each secured to one of two electrode holders 53 which are fitted in an insulating spacer 52 of substantially cylindrical configuration which is closed by an end cap 63 formed of insulating material. The insulating spacer 52 is formed with two holes extending through the electrode holders 53, and a threaded hole extending through its side wall to communicate with the internal space for threadably connecting a plasma gas pipe 62 to supply plasma gas therethrough.

A nozzle member 51 is fitted to the insulating spacer 52 and connected through a lead to the positive output terminal of the plasma power source 11 of the ignition-plasma device 10 (FIG. 2c). The two electrode holders 53 are connected to the two terminals of the filament heating power source 84 of the ignition-plasma device 10 (FIG. 2c) by leads which extend through the holes formed in the insulating spacer 52.

In the modification of the plasma projector 13 shown in FIG. 4, the holes necessary for passing a current to the filament 85 may be formed in the end cap 63 of insulating material, in place of being formed in the insulating spacer 52, so that leads can be extended therethrough to pass a current to the filament 85.

What is claimed is:

1. A method of igniting an arc between at least one electrode having an electrode tip and a workpiece on which work is to be performed comprising the steps of: forming an electric field in the vicinity of said at least one electrode and workpiece; and projecting an ignition-plasma against a cathode to thereby form an arc, wherein said step of forming an electric field comprises arranging said electrode and electrode tip for the electrode in a manner to face said workpiece on which an operation is to be performed, connecting said electrode through said electrode tip to a negative terminal of a D.C. power source for performing the operation on the workpiece while connecting said workpiece to a positive terminal thereof, arranging fixedly an auxiliary electrode in a manner to face the side surface of said electrode or the side surface of said electrode tip and electrically connecting the auxiliary electrode and the workpiece so as to obtain the same electric potential and so as to direct the electric field from the auxiliary electrode toward the electrode or electrode tip, and said step of projecting an ignition-plasma into the electric field comprises projecting an ignition-plasma into the electric field from the vicinity of said auxiliary electrode against the electrode or the electrode tip to form a cathode spot on the electrode or the electrode tip, first forming an arc between the electrode or the electrode tip and the auxiliary electrode so as to form an anode spot on the auxiliary electrode and then transferring said cathode spot to the forward end of the electrode depending on the flow rate of shield gas and/or the shape of the electric field so as to transfer the anode spot of said auxiliary electrode whereby an arc is ignited between the electrode and the workpiece.

2. The method of claim 1 wherein said ignition-plasma which is projected into said electric field is ignited by self-heating a self-exothermic electrode.

3. A method of igniting an arc by forming an electric field in the vicinity of at least one electrode and a workpiece on which an operation is to be performed and projecting an ignition-plasma into said electric field in such a manner that the ignition-plasma is directed against a cathode to thereby form an arc wherein the step of forming an electric field comprises arranging said electrode and an electrode tip for the electrode in a manner to face said workpiece on which an operation is to be performed, connecting said electrode through said electrode tip to one output terminal of an A.C. power source for performing an operation on the workpiece while connecting said workpiece to the other output terminal of the A.C. power source, arranging an auxiliary electrode in a manner to face the side surface of said electrode or the side surface of said electrode tip and grounding the auxiliary electrode and the workpiece so as to direct the electric field, for a positive half-wave of the A.C. current in which the electrode is negative and the workpiece is positive, from the auxiliary electrode toward the electrode or the electrode tip and, for a negative half-wave of the A.C. current in which the electrode is positive and the workpiece is negative, from the electrode toward the workpiece, and said step of projecting an ignition-plasma into the electric field comprises projecting, for the positive half-wave, an ignition-plasma from the vicinity of the auxiliary electrode against the electrode or the electrode tip to form a cathode spot on the electrode or the electrode tip to first form an arc between the electrode tip and the auxiliary electrode and then shifting the cathode spot to the forward end of the electrode depending on the flow rate of shield gas and/or the shape of the electric field, whereby an arc is finally ignited between the electrode and the workpiece, and projecting, for the negative half-wave, an ignition-plasma against the workpiece to form a cathode spot on the workpiece, whereby an arc is ignited between the electrode and the workpiece.

4. A method of igniting arcs as claimed in claim 3, wherein an electrode heating arc igniting process is used in the step of projecting an ignition-plasma into the electric field.

* * * * *